United States Patent [19]

Chang et al.

[11] Patent Number: 5,060,146
[45] Date of Patent: Oct. 22, 1991

[54] MULTILINGUAL INDEXING SYSTEM FOR ALPHABETICAL LYSORTING BY COMPARING CHARACTER WEIGHTS AND ASCII CODES

[75] Inventors: Philip Y. T. Chang; Michael R. Cross, both of Austin, Tex.

[73] Assignee: International Business Machines Corporation, Armonk, N.Y.

[21] Appl. No.: 179,179

[22] Filed: Apr. 8, 1988

[51] Int. Cl.$^5$ .................. G06F 7/08; G06F 15/38; G06F 15/401; G06F 7/04
[52] U.S. Cl. .................. 364/900; 364/222.81; 364/222.9; 364/226.4; 364/259.2; 364/280; 364/282.1; 364/920.4; 364/947.2; 364/962.3; 364/963.5; 364/947; 364/976; 364/419
[58] Field of Search ... 364/200 MS File, 900 MS File, 364/419

[56] References Cited

U.S. PATENT DOCUMENTS

| | | | |
|---|---|---|---|
| 4,468,756 | 8/1984 | Chan | 364/900 |
| 4,498,148 | 2/1985 | Glickman | 364/900 |
| 4,499,555 | 2/1985 | Huang | 364/900 |
| 4,507,734 | 3/1985 | Kaldas | 364/419 |
| 4,510,567 | 4/1985 | Chang et al. | 364/300 |
| 4,595,995 | 6/1986 | Alles | 364/900 |
| 4,611,280 | 9/1986 | Linderman | 364/300 |
| 4,641,264 | 2/1987 | Nitta et al. | 364/900 |
| 4,685,060 | 8/1987 | Yamano et al. | 364/419 |
| 4,706,212 | 11/1987 | Toma | 364/900 |
| 4,731,021 | 3/1988 | Chan | 434/156 |
| 4,809,158 | 2/1989 | McCaulley | 364/200 |
| 4,849,898 | 7/1989 | Adi | 364/200 |
| 4,864,628 | 9/1989 | Scott | 382/21 |
| 4,873,625 | 10/1989 | Archer et al. | 364/200 |
| 4,882,703 | 11/1989 | Nicolai | 364/900 |
| 4,939,639 | 7/1990 | Lee | 364/200 |

OTHER PUBLICATIONS

IBM Technical Disclosure Bulletin, "Lexicographic Sorting", vol. 23, No. 6, Nov. 1980, p. 2409.
IBM Progamming Reference "Operating System/2 Technical Reference Version 1.1", vol. 1, Dec. 1988.

Primary Examiner—Archie E. Williams, Jr.
Assistant Examiner—Ayni Mohamed
Attorney, Agent, or Firm—Douglas H. Lefeve; Mark E. McBurney

[57] ABSTRACT

A sorting technique which relies on the operating system collating weights of characters to the extent that a collating weight difference exists in any of the pairs of corresponding characters of two different strings of characters being compared. While this comparision is being made, the first tie of collating weights for a pair of nonidentical corresponding characters triggers a comparison of the ASCII code values of the two corresponding characters which tied. Assuming that such a tie has occurred, and if, after reaching the end of this process no differences in the collating weights of corresponding characters are found, then if one string has a corresponding character with a lower ASCII value, that string is considered to precede the other string in the alphabetic sequence. This results in an automated alphabetizing procedure which is consistent regardless of the order in which the character strings are sorted, while retaining the flavor of the language conventions when possible, and while providing a solution not requiring substantial extra computing power.

6 Claims, 5 Drawing Sheets

MULTILINGUAL INDEXING SYSTEM FOR ALPHABETICAL LYSORTING BY COMPARING CHARACTER WEIGHTS AND ASCII CODES

DESCRIPTION

1. Technical Field

This invention relates generally to sorting and indexing text and more particularly to accommodating language conventions in sorting and indexing while providing consistency in these functions.

2. Background Art

It has been well known to use computers to process text data. An example of one type of data processing in which text data is processed is data base management. Data base management can range from applications as simple as addressing a group of envelopes to extremely complex applications requiring substantial amounts of time to access and process the data.

In providing information from a data base to a human user, it is usually desirable to present the information to the user in a sorted format. The information is sometimes sorted in a format related to numbers, for examples, chronologically or by cost. It is also very common to sort at least a portion of the information alphabetically. This invention is related to the alphabetic sorting of information, rather than to numerical sorting.

For persons dealing only with the English language, the task of alphabetic sorting might seem like a trivial one. In fact, children are taught the sequence of characters in the alphabet almost as soon as they can talk and they are taught how to alphabetize words in the early years of their formal educations. With considerable certainty, a number of people will agree on the order in which to alphabetically list a plurality of English words.

With some languages other than English, the task becomes considerably less trivial. For example, the other language may use more or less characters than those in the English alphabet and the common characters may be in a different order than the correct order for the English alphabet. Thus, without some knowledge of the other language, the task is impossible. Even those skilled in the other language may disagree on the preferred order in alphabetizing words containing certain characters.

With English the task is simple for computers as well as for school children when ASCII, the American Standard Code for Information Interchange, is used. This, of course, is because ASCII is based on the English language and, therefore, characters are purposefully placed in alphabetical order in the ASCII sequence. Accordingly, a "c" has a lower ASCII value than an "x". Thus, one solution to the problem of alphabetizing words in a language base other than English would be to translate to a different code set, analogous to ASCII, in which the characters of that language were ordered in a correct, or at least a recognized, alphabetic sequence for that language. This solution, however, is prohibitively complex to yield acceptable performance with many existing personal computing systems.

Both the IBM and Microsoft Operating Systems/2 (OS/2) have addressed some of the language peculiarities by defining tables in which each character in that language is assigned a collating "weight". By reference to this table the relative order of different characters may become apparent during an alphabetizing process. One deficiency of these tables for all characters is that equal weights are assigned to both the upper case and lower case versions of the same character. Another serious problem is that some weights are applicable to groups of characters, rather than to a single character. For example, all versions of the character "a", with many variations of diacritics, have the same weight. Thus, a "tie" can occur during alphabetization, which is unacceptable in many computerized processes.

It would, therefore, be of great utility to provide a straightforward technique for assuring a consistent alphabetizing process in personal computer systems while not sacrificing the system performance inherent in prior art techniques.

SUMMARY OF THE INVENTION

Accordingly, a technique is provided which relies on the operating system collating weights of characters to the extent that a collating weight difference exists in any of the pairs of corresponding characters of two different strings of characters being compared. While this comparison is being made, the first tie of collating weights for a pair of nonidentical corresponding characters triggers a comparison of the ASCII code values of the two corresponding characters which tied. Assuming that such a tie has occurred, and if, after reaching the end of this process no differences in the collating weights of corresponding characters are found, then if one string has a corresponding character with a lower ASCII value, that string is considered to precede the other string in the alphabetic sequence.

More particularly, the respective collating weights of pairs of corresponding characters of each of two character strings are compared. If a difference in collating weights of two corresponding characters is detected, the character string having the corresponding character with the lower collating weight is considered to precede the other character string. However, if a pair of nonidentical corresponding characters has the same collating weight the binary ASCII code value of the two characters are compared and the character having the lower ASCII value is conditionally deemed to precede the other character. If, during the remainder of the comparisons of corresponding pairs, a pair is found to have differing collating weights, then that difference, and not the ASCII difference of the earlier characters, controls the ordering of the two character strings. If, however, during the subsequent comparisons of each corresponding character pair, no difference in collating weights is detected, then the difference in the ASCII values of the first pair of nonidentical ASCII characters is used to determine the order of the two character strings, by placing the character string having the corresponding character with the lower ASCII value before the other character string. Thus, the collating weights of corresponding character pairs serve as the primary comparison, while the binary values of the ASCII codes of the first nonidentical, tying, corresponding character pair serve as the secondary comparison when an unbroken tie persists after all primary comparisons have been made.

The foregoing and other objects, features, extensions, and advantages of the invention will be apparent from the following more particular description of preferred embodiments of the invention as illustrated in the accompanying drawings.

DESCRIPTION OF THE PREFERRED EMBODIMENT

Figure 1:
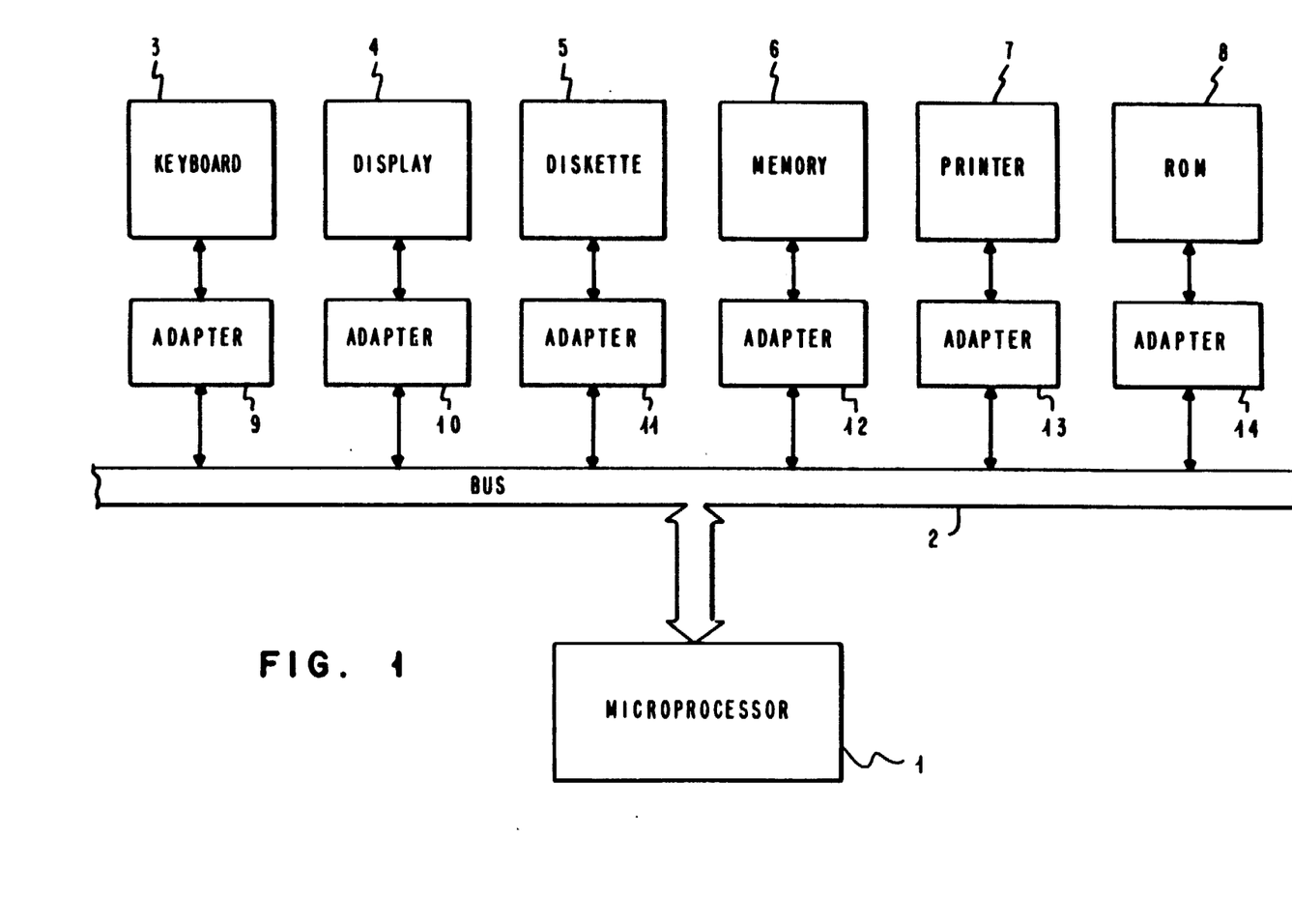
FIG. 1 is a block diagram of a data processing system which includes a stored program for performing the function of this invention in conjunction with the data processing system.

Beginning with reference to the block diagram of FIG. 1, a typical personal computer architecture is shown, such as the configuration used in the IBM Personal Computer. The focal point of this architecture comprises a microprocessor 1 which may, for example, be an Intel 80286 or similar microprocessor. The microprocessor 1 is connected to a bus 2 which comprises a set of data lines, a set of address lines and a set of control lines. A plurality of I/O devices or memory or storage devices 3-8 are connected to the bus 2 through separate adapters 9-14, respectively. For example, the display 4 may be the IBM Personal Computer Color Display and the adapter 10 may, accordingly, be the IBM Color/Graphics Adapter. The other devices 3 and 5-8 and adapters 9 and 11-14 are either included as part of an IBM Personal Computer or are available as plug-in options from the IBM Corporation. The random access memory (RAM) 6 and the read-only memory (ROM) 8 and their corresponding adapters 12 and 14 are included as standard equipment in the IBM Personal Computer, although additional random access memory to supplement memory 6 may be added via a plug-in memory expansion option.

Within the read-only memory 8 are stored a plurality of instructions, known as the basic input/output operating system, or BIOS, for execution by the microprocessor 1. The BIOS controls the fundamental operations of the computer. An operating system such as the IBM Operating System/2, or OS/2, which may be used with some of the IBM Personal Computer and Personal System/2 computer families, is loaded into the memory 6 and runs in conjunction with the BIOS stored in the ROM 8. It will be understood by those skilled in the art that the personal computer system could be configured so that parts or all of the BIOS are stored in the memory 6 rather than in the ROM 8 so as to allow modifications to the basic system operations by changes made to the BIOS program, which would then be readily loadable into the random access memory 6.

An application program is also loaded into the memory 6 to provide instructions to the microprocessor 1 to enable a comprehensive set of tasks, including data base management, to be performed by the personal computer system shown in FIG. 1. An application program loaded into the memory 6 is said to run in conjunction with the operating system previously loaded into the memory 6.

While a data base management application running in conjunction with OS/2 is used as an example of the type of program for which the present invention would represent a great enhancement, those skilled in the art will recognize that this invention will enhance a wide variety of types of application programs. Those skilled in the art will also recognize that, although the aforementioned hardware system is well known in the art, this invention comprises the combination of a hardware system which is configured or programmed according to the teaching of this invention, as described in detail below.

Figure 2:
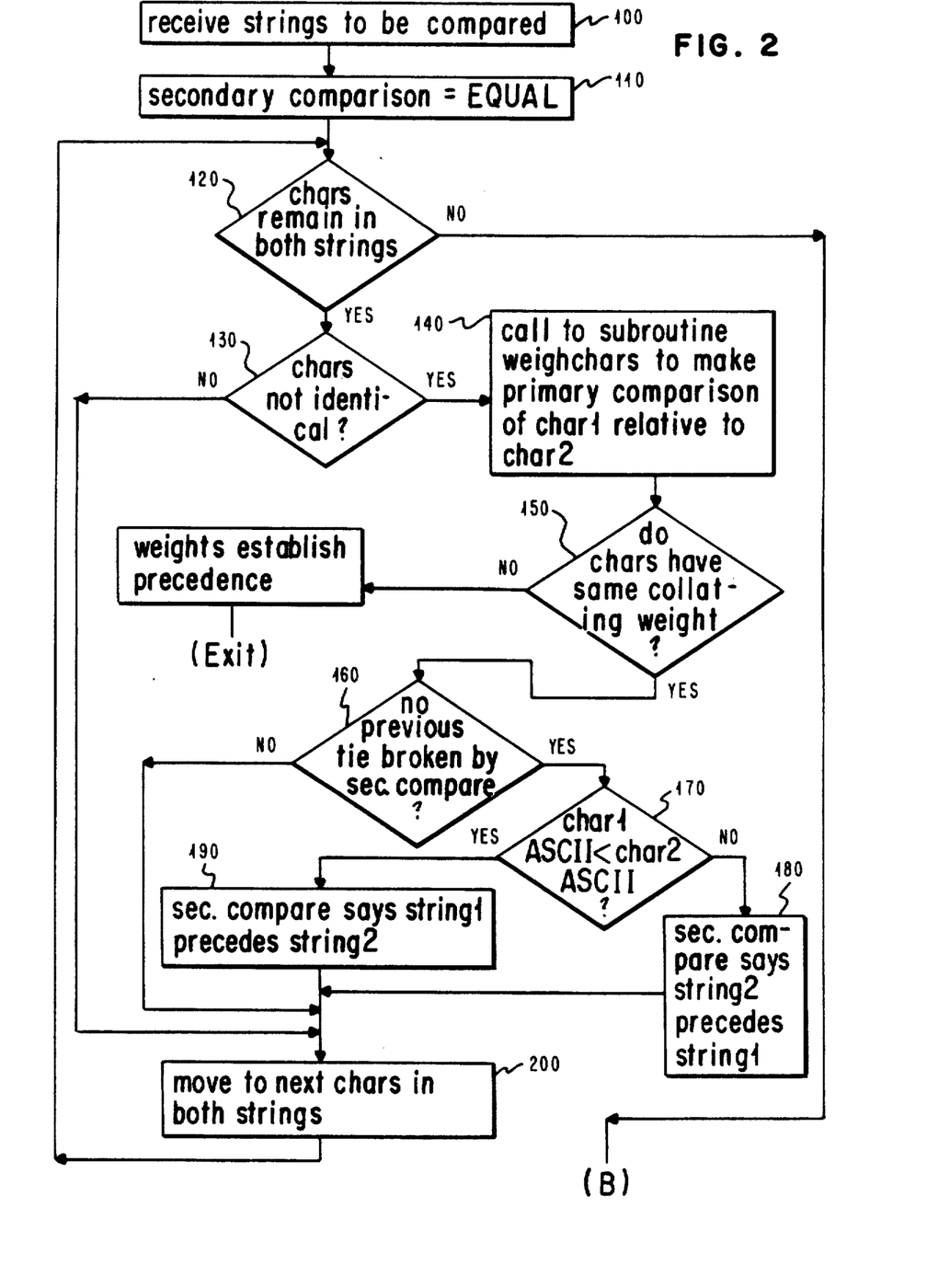
FIGS. 2-5 are flow charts of the logical operations performed in the operation of the preferred embodiment of this invention.

Refer now to FIG. 2, for a description of the logical operations in the implementation of this invention. Char1 and Char2 are corresponding characters of two text words, String1 and String2. At 100 the operation receives String1 and String2 to be compared. At 110 the secondary comparison is set to EQUAL.

At 120 a test is made to determine if characters remain in the string under test. Assume for now that characters do remain in the string to be tested. Therefore, at 130 a test is made to determine if the two corresponding characters being compared are not identical. (In this first pass, of course, the two corresponding characters being tested are the first character of each string.) If the characters are identical the operation jumps to 200 wherein the following pair of corresponding characters are examined, since there can be no difference in the ordering of identical characters. Assume now that the characters are not identical. The operation then jumps to the Weighchars subroutine in FIG. 5 to determine the weight of Char1 relative to the weight of Char2.

Figure 5:
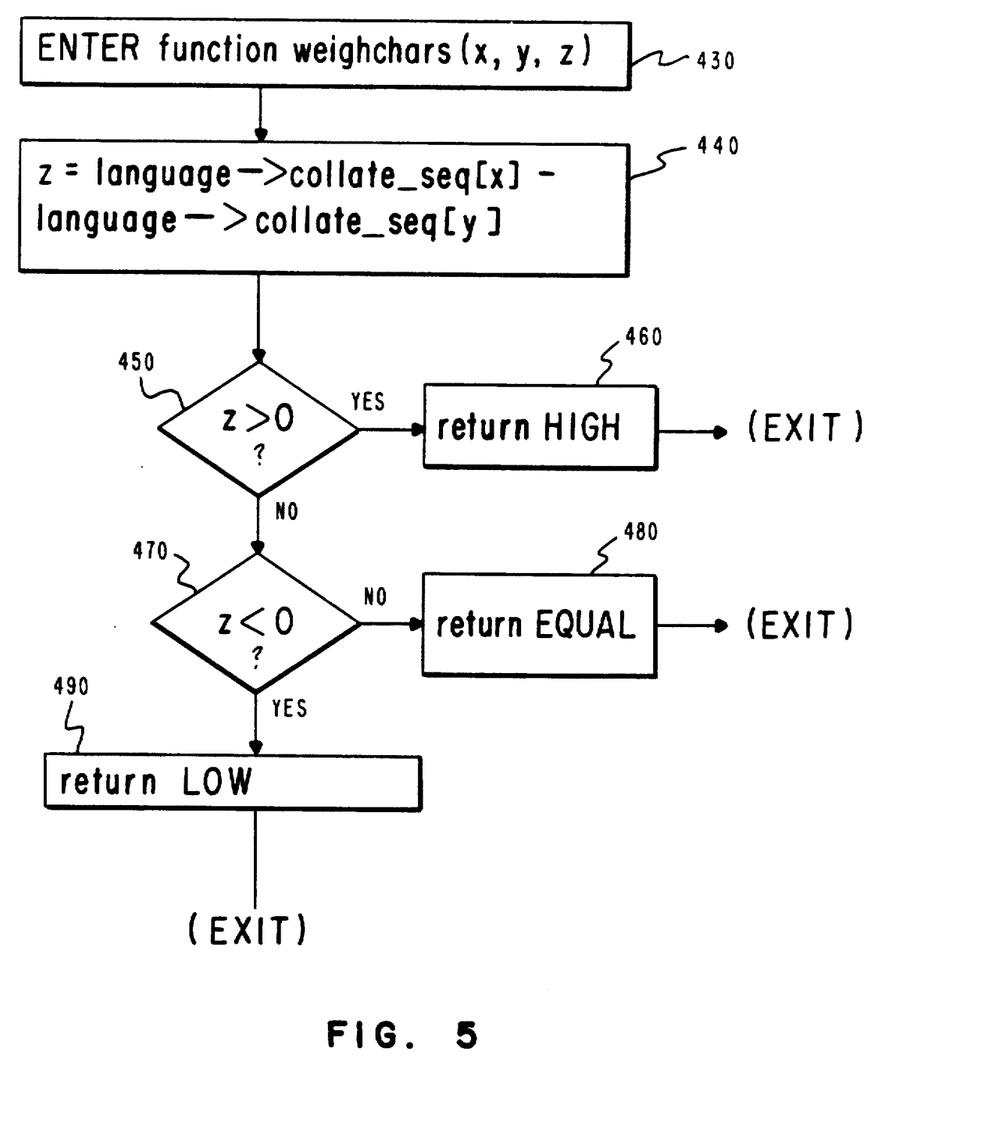

In FIG. 5 at 430 the Weighchars subroutine is entered to compare the weights of Char1 and Char2. The value of the character itself is used to index into the collating table of the operating system, such as the aforementioned OS/2. A variable, DIFF, is calculated at 440 which represents the difference between the collating weights of Char1 minus the collating weight of Char2. At 450 a test is made to determine if DIFF is greater than zero. If so, a HIGH result is returned at 460 which indicates that String1 has a greater weight than String2. This, of course, means that String2 should precede String1 in the alphabetizing sequence, since lower weights are placed earlier in the sequence. If at 450 DIFF is not greater than zero, at 470 a test is made to determine if DIFF is less than zero. If so, at 490 a LOW result is returned which indicates that String1 has a lesser weight than String2, meaning that String1 should precede String2 in the sequence. If at 470 DIFF is not less than zero then an EQUAL result is returned at 480 which means that a tie in weights exists with these two corresponding characters. The operation now proceeds back to 150, FIG. 2.

In FIG. 2, at 150 a test is made to determine if, in the Weighchars subroutine of FIG. 5, both characters were found to have EQUAL weights. If not, then the unequal weights establish the precedence in the sequence. That is, if LOW was returned then String1 should precede String2, while if HIGH was returned String2 should precede String1. In either of these cases the operation of this invention is exited at this point. If, however, both Char1 and Char2 are found to have EQUAL weights the operation proceeds to 160 where a test is made to determine if no previous corresponding character weight tie has been broken by the secondary comparison. If a previous tie has been broken the operation proceeds to 200 at which point the next pair of corresponding characters are accessed and compared. If a pair of corresponding characters are found later in String1 and String2 which have unequal weights, then that comparison will prevail.

If at 160 no previous tie has been decided by the secondary comparison, then at 170 a test is made to determine if the ASCII code of Char1 has a lower binary value than that of the ASCII code of Char2. If so, at 190 the secondary comparison holds that String1 conditionally precedes String2. If not, at 180 the secondary comparison holds that String2 conditionally precedes String1. In either of these cases the operation proceeds to 200 wherein the following corresponding characters are tested so that any differences in weights that are detected in the testing of the remainder of the corresponding characters will be the controlling factor in the ordering of the strings, rather than the result of the test at 170. However, in the event that all of the remaining tests of the weights of pairs of corresponding characters return EQUAL, then the result of the test at 170 will determine which of String1 or String2 is placed earlier in an output listing of character strings.

Assume now that after a number of corresponding pairs of Char1 and Char2 have been tested it is found at 120 that characters do not remain in at least one of the strings. The operation then jumps to 220, FIG. 3, at which point a test is made to determine if String2 is not exhausted. Assuming that all characters of String2 have not been weighed, at 230 a test is made to determine if the Char2 of String2 is not a blank. If Char2 is a blank the operation jumps to 300 wherein the following characters of String2 are examined, since there can be no difference in the ordering of blank characters. If this character is not a blank, at 240 the Weighchars subroutine of FIG. 5 is again called for a comparison of the weight of Char2 relative to the weight of a blank. The operation of the Weighchars subroutine is virtually the same here as in the description above, with the difference being that instead of there being a Char1 of String1 to compare, the Char2 of String2 is compared relative to a blank which now assumes the position of Char1.

Figure 3:
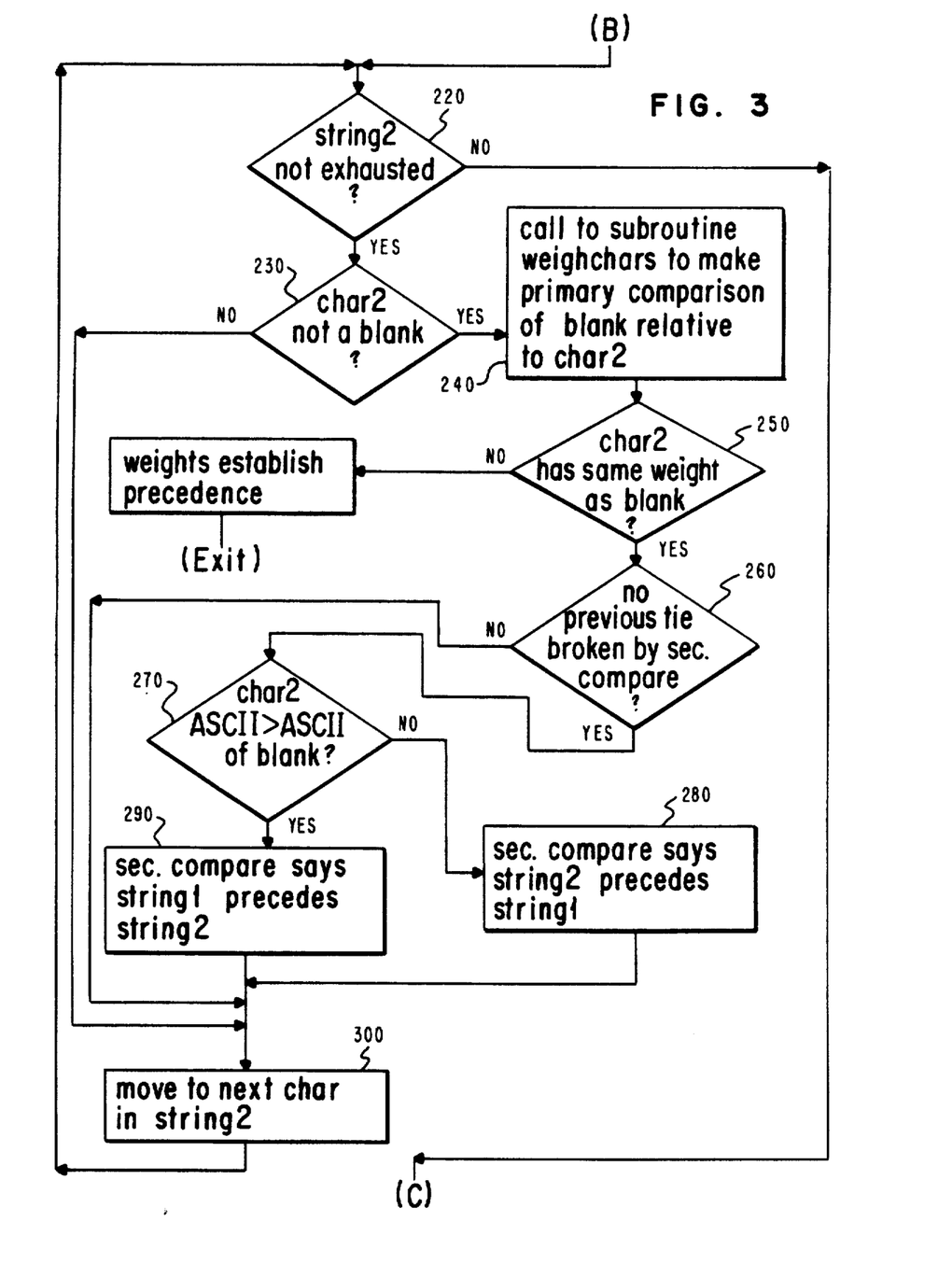

At the conclusion of the Weighchars subroutine of FIG. 5, the operation returns to 250, FIG. 3, at which point the operation proceeds to determine if, in the Weighchars subroutine of FIG. 5, both Char2 and a blank were found to have EQUAL weights. If not, then the unequal weights establish the precedence in the sequence. That is, if LOW was returned then String1 should precede String2, while if HIGH was returned String2 should precede String1. In either of these cases the operation of this invention is exited at this point. If, however, both a blank and Char2 are found to have EQUAL weights the operation proceeds to 260 where a test is made to determine if no previous corresponding character weight tie has been broken by the secondary comparison. If a previous tie has been broken the operation proceeds to 300 at which point String2 is again tested to determine if it has been exhausted and, if not, the weights of the next character of String2 and the blank are compared. If a pair comprising a character of String2 and a blank is found later to have unequal weights, then that comparison will prevail.

If at 260 no previous tie has been decided by the secondary comparison, then at 270 a test is made to determine if the ASCII code of Char2 has a binary value greater than that of the ASCII code of a blank. If so, at 290 the secondary comparison holds that String1 conditionally precedes String2. If not, at 280 the secondary comparison holds that String2 conditionally precedes String1. In either of these cases the operation proceeds to 300 wherein the following characters of String2 are tested in relation to blanks so that any differences in weights that are detected in the testing of the remainder of the characters will be the controlling factor in the ordering of the strings, rather than the result of the test at 270. However, in the event that all of the remaining tests of the weights of the characters remaining in String2 compare EQUAL with the weight of a blank, then the result of the test at 270 will determine which of String1 or String2 is placed earlier in an output listing of character strings.

Figure 4:
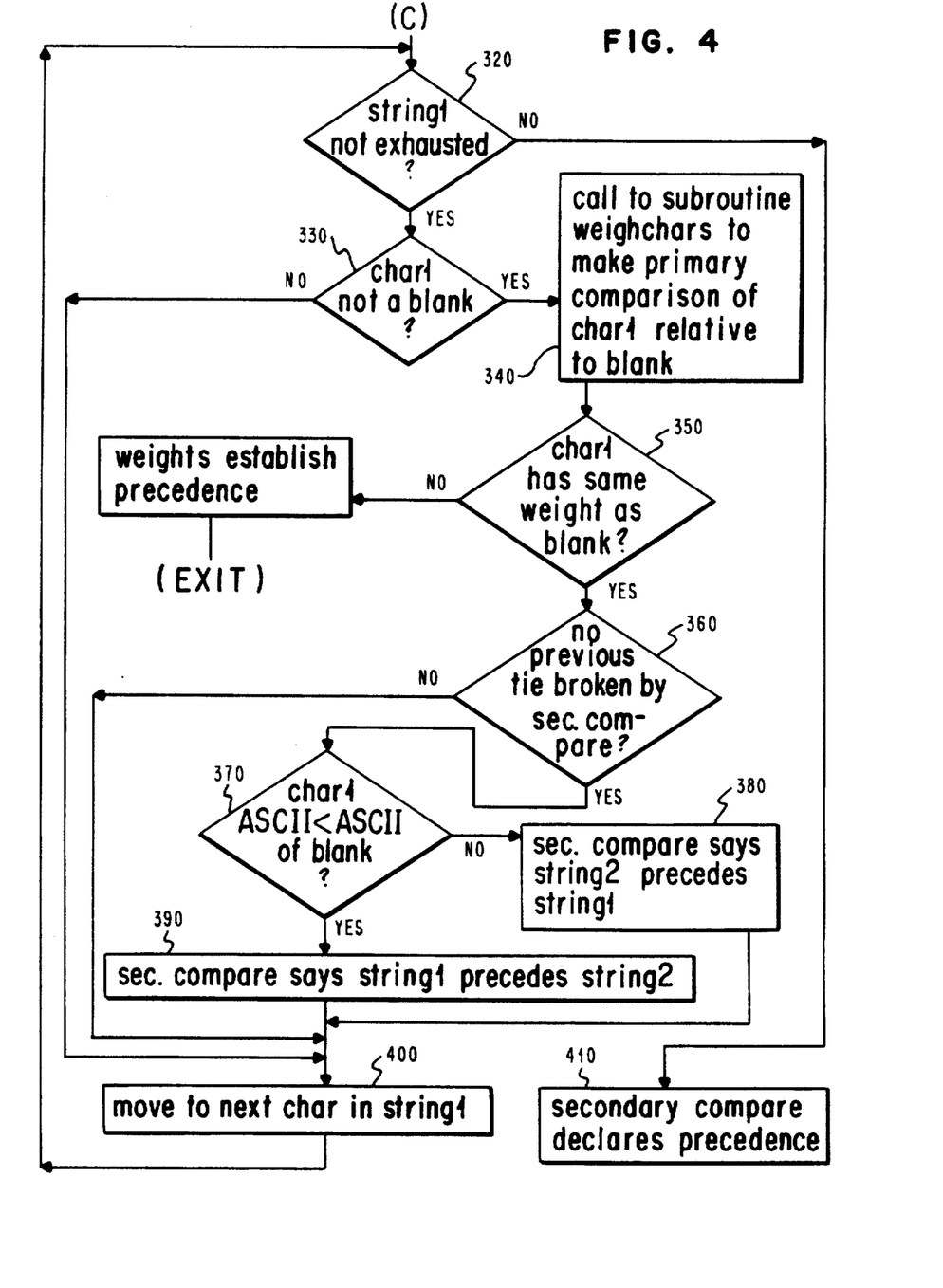

If at 220, String2 is exhausted, the operation proceeds to 320 in FIG. 4, at which point a test is made to determine if String1 is not exhausted. Assuming that all characters of String1 have not been weighed, at 330 a test is made to determine if the Char1 of String1 is not a blank. If Char1 is a blank the operation jumps to 400 wherein the following characters of String1 are examined, since there can be no difference in the ordering of blank characters. If this character is not a blank, at 340 the Weighchars subroutine of FIG. 5 is again called for a comparison of the weight of Char1 relative to the weight of a blank. The operation of the Weighchars subroutine is virtually the same here as in the description above, with the difference being that instead of there being a Char2 of String2 to compare, the Char1 of String1 is compared relative to a blank which now assumes the position of Char2.

At the conclusion of the Weighchars subroutine of FIG. 5, the operation returns to 350, FIG. 4, at which point the operation proceeds to determine if, in the Weighchars subroutine of FIG. 5, both Char1 and a blank were found to have EQUAL weights. If not, then the unequal weights establish the precedence in the sequence. That is, if LOW was returned then String1 should precede String2, while if HIGH was returned String2 should precede String1. In either of these cases the operation of this invention is exited at this point. If, however, both a blank and Char1 are found to have EQUAL weights the operation proceeds to 360 where a test is made to determine if no previous corresponding character weight tie has been broken by the secondary comparison. If a previous tie has been broken the operation proceeds to 400 at which point String1 is again tested to determine if it has been exhausted and, if not, the weights of the next character of String1 and the blank are compared. If a pair comprising a character of String1 and a blank is found later to have unequal weights, then that comparison will prevail.

If at 360 no previous tie has been decided by the secondary comparison, then at 370 a test is made to determine if the binary value of the ASCII code of Char1 is greater than that of the ASCII code of a blank. If so, at 390 the secondary comparison holds that String1 conditionally precedes String2. If not, at 380 the secondary comparison holds that String2 conditionally precedes String1. In either of these cases the operation proceeds to 400 wherein the following characters of String1 are tested in relation to blanks so that any differences in weights that are detected in the testing of the remainder of the characters will be the controlling factor in the ordering of the strings, rather than the result of the test at 370. However, in the event that all of the remaining tests of the weights of the characters remaining in String1 compare EQUAL with the weight of a blank, when all characters in String1 have been exhausted, the operation jumps to 420 wherein the result of the secondary comparison test of 170, 270, or 370, as applicable, will determine which of String1 or String2 is placed earlier in an output listing of character strings.

The following C program language listing is another form of the description of the above logical operation of this invention. This listing parallels the operation described above for FIGS. 2-5.

```
#define min(x,y) (((x) < (y)) ? (x) : (y))
#define weighchars( x, y, z )
        ( ((z = language—>collate_tbl[x] -
                        language—>collate_tbl[y]) > 0)?
                ( HIGH ) :
                ( ( z < 0 ) ?
                ( LOW ) :
                ( EQUAL )
                ) /* z <=0 */
        )/* end macro foreignchr */
static short near compare(s1,s2,lens1,lens2)
        unsigned char *s1, *s2; /* pointers to strings 1 and 2 */
        short          slen1, slen2; /* lengths of strings 1 and 2 */
{/* local variables */
        short diff;/* difference in collating weights */
        short n, lendiff;/* min or max length depending which part
                of algorithm */
        short secondary;/* tiebreaker return code */
        short primary;/* priority 1 return code */
/*-----------------------------------------------------------*/
/* Compare strings (left to right) until shorter one ends. */
/*-----------------------------------------------------------*/
n = ( ( lens1 < lens2 ) ? ( lens1 ) : ( lens2) );
secondary = EQUAL;
/* Do until mismatch or end of shorter string. */
for ( ; n > 0 ; s1++, s2++, n--)
{
    /* If characters are not identical */
    if( *s1 != *s2 )
    {
        /* if *s1 & *s2 have different collating weights, return  */
        /* result of weighchars(,). Precedence is established.    */
        /* Else if *s1 and *s2 are FIRST nonidentical chars to    */
        /* have same collating weights, set secondary to          */
        /* tentative precedence (one with lower binary value).    */
        /* This insures "Frank" and "frank" precede "Franx" and   */
        /* "franx" (in U.S. English).                             */
        if( (primary = weighchars( *s1, *s2, diff )) == EQUAL )
        {
            /* "secondary" remembers that case difference. */
            if ( secondary == EQUAL )
            {
                secondary =( ( *s1 < *s2 ) ? ( LOW ) : ( HIGH ) );
            } /* end if secondary == EQUAL */
        }
        else return ( primary ); /* order of string 1 */
    } /* end if *s1 != *s2 */
} /* end for each char til end of shorter string */
/*-----------------------------------------------------------*/
/* Compare continues after padding shorter string.  */
/*-----------------------------------------------------------*/
n = lens2 - lens1;
for ( ; n > 0 ; s2++, n-- )
{
    /* if blank & *s2 have different collating weights, return*/
    /* result of weighchars(,). Precedence is established. */
    /* Else if blank and *s2 are FIRST nonidentical chars to */
    /* have same collating weights, set secondary to         */
    /* tentative precedence (one with lower binary value).   */
    if ( *s2 != ' ' )
    {
        if( (primary1 = weighchars(' ', *s2, diff)) == EQUAL)
        {
            if ( secondary == EQUAL )
            {
                secondary = ( ( ' ' < *s2 ) ? ( LOW ) : ( HIGH ) );
            } /* end if secondary == EQUAL */
        }
        else /* *s2 == ' ' */
        return ( primary ); /* order of string 1 */
    } /* end if *s2 != ' ' */
} /* end for */
for ( ; (n < 0); s1++, n++)
{
    /* if blank & *s1 have different collating weights, return*/
    /* result of weighchars(,). Precedence is established. */
    /* Else if blank and *s1 are FIRST nonidentical chars to */
    /* have same collating weights, set secondary to         */
    /* tentative precedence (one with lower binary value).   */
    if (*s1 != ' ')
    {
        if( (primary = weighchars(*s1, ' ', diff)) == EQUAL )
```

-continued

```
        {
            if( secondary == EQUAL )
            {
                secondary = ( ( *s1 < ' ' ) ? ( LOW ) : ( HIGH ) );
            } /* end secondary == EQUAL */
        }
        else
        return ( primary ); /* order of string 1 */
    } /* end if *s1 != ' '*/
} /* end for loop - exhaust string 1 */
return ( secondary ); /* order of string 1 relative to string 2 */
}/* compare */
```

In summary, a technique has been described in which relies on the operating system collating weights of characters to the extent that a collating weight difference exists in any of the pairs of corresponding characters of two different strings of characters being compared. While this comparison is being made, the first tie of collating weights for a pair of nonidentical corresponding characters triggers a comparison of the ASCII code values of the two corresponding characters which tied. Assuming that such a tie has occurred, and if, after reaching the end of this process no differences in the collating weights of corresponding characters are found, then if one string has a corresponding character with a lower ASCII value, that string is considered to precede the other string in the alphabetic sequence. This results in an automated alphabetizing procedure which is consistent regardless of the order in which the character strings are sorted, while retaining the. flavor of the language conventions when possible, and while providing a solution not requiring substantial extra computing power.

While the invention has been shown and described with reference to particular embodiments thereof, it will be understood by those skilled in the art that the foregoing and other changes in form and details may be made therein without departing from the spirit and scope of the invention. For example, those skilled in the art will recognize that while the invention has been described with reference to sorting in ascending alphabetical order, the invention is equally applicable to sorting in descending order while utilizing the principles of the invention.

We claim:

1. A method of operating a computer system, including an operating system computer program, to automatically order strings of characters, comprising:

comparing, with a programmed computer processor, only computer program defined collating weights, specific to a first language and obtained from said operating system, of nonidentical pairs of corresponding characters in a first and second of said strings of characters;

performing a secondary comparison, with said programmed computer processor, of ASCII numerical values of characters of a first pair of said corresponding characters when both characters of said pair of corresponding characters are determined to have equal collating weights; and positioning, with said programmed computer processor, a character string having a corresponding character with a lower ASCII numerical value to have a predetermined order with respect to the other of said first and second character strings when each pair of corresponding characters succeeding said first pair also has equal collating weights.

2. The method of claim 1 wherein said computer program defined collating weights of characters of one string not having corresponding characters in the other string due to said one string's being longer than said other string are compared relative to blanks.

3. The method of claim 2 wherein said predetermined order is an ascending order.

4. The method of claim 2 wherein said predetermined order is a descending order.

5. A computer system for automatically ordering strings of characters, comprising:
   first means in said computer system for comparing only computer program defined collating weights of nonidentical pairs of corresponding characters in a first and second of said strings of characters;
   second means in said computer, responsive to said first means for comparing, for performing a secondary comparison of ASCII numerical values of characters of a first pair of said corresponding characters when both characters of said pair of corresponding characters are determined to have equal collating weights; and
   means in said computer system, responsive to said first and second means for comparing, for positioning a character string having a corresponding character with a lower ASCII numerical value to have a predetermined order with respect to the other of said first and second character strings when each pair of corresponding characters succeeding said first pair also has equal collating weights.

6. A computer program for causing automatic ordering of strings of characters in a computer system, comprising:
   first means for operating said computer system to compare only computer program defined collating weights of nonidentical pairs of corresponding characters in a first and second of said strings of characters; second means for operating said computer system, responsive to said first means for comparing, to perform a secondary comparison of ASCII numerical values of characters of a first pair of said corresponding characters when both characters of said pair of corresponding characters have equal collating weights; and
   means for operating said computer system, responsive to said first and second means for comparing, to position a character string having a corresponding charter with a lower ASCII numerical value to have a predetermined order with respect to the other of said first and second character strings when each pair of corresponding characters succeeding said first pair also has equal collating weights.

* * * * *

UNITED STATES PATENT AND TRADEMARK OFFICE
CERTIFICATE OF CORRECTION

PATENT NO. : 5,060,146

DATED : October 22, 1991

INVENTOR(S) : Philip Y. T. Chang and Michael R. Cross

It is certified that error appears in the above-identified patent and that said Letters Patent is hereby corrected as shown below:

On the Title page
Title of Patent, line 2, please delete "ALPHABETICAL LYSORTING" and insert --ALPHABETICALLY SORTING--.

Signed and Sealed this

Twenty-third Day of February, 1993

Attest:

STEPHEN G. KUNIN

*Attesting Officer*     Acting Commissioner of Patents and Trademarks